Nov. 30, 1943.    M. I. TOPALOV    2,335,817
STREAM MOTOR
Filed Jan. 29, 1940    2 Sheets-Sheet 2

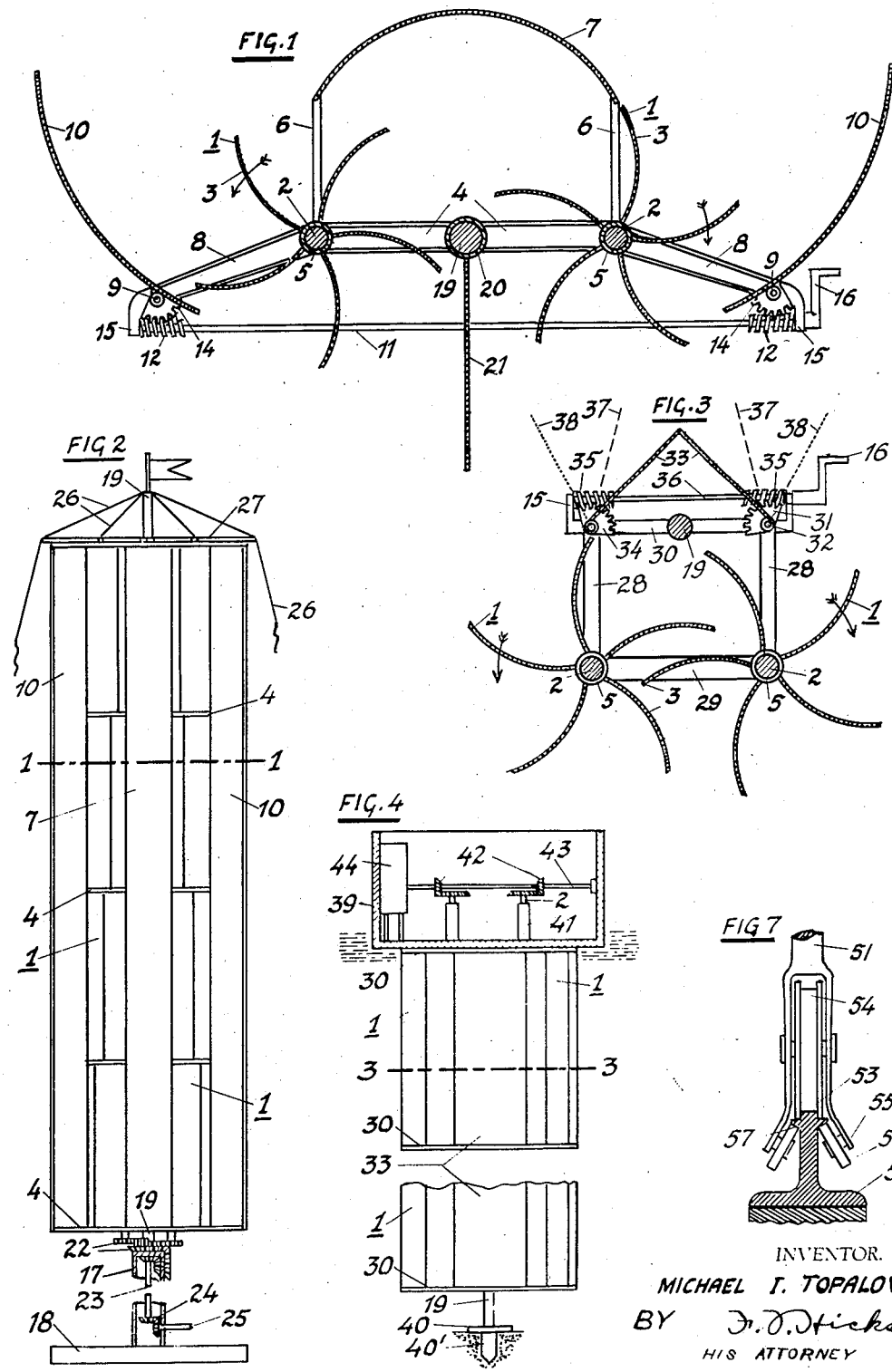

INVENTOR.
MICHAEL I. TOPALOV
BY
HIS ATTORNEY

Patented Nov. 30, 1943

2,335,817

UNITED STATES PATENT OFFICE 2,335,817

STREAM MOTOR

Michael I. Topalov, Detroit, Mich.

Application January 29, 1940, Serial No. 316,149

2 Claims. (Cl. 170—13)

My invention relates either to water or to wind power motors which are composed of two or more rotors rotating in opposite directions about vertical axes.

It is an object of my invention to provide a simple and efficient motor to utilize either the wind or the natural flow of water without the aid of dams or the like.

It is also an object of my invention to provide a wind motor in which the size, the weight and the cost of construction may be directly proportional to the capacity, permitting by this the construction of very large units and overcoming the obstacle existing in the construction of windmills of present type, in which, other conditions being equal, the weight of a windmill and its cost varies directly as the cube of the diameter of its wheel, while its power varies directly as the square of the wheel diameter. Hence in increasing the size of windmills of present type, the weight, and the consequent cost of material, increases more rapidly than the capacity, and it is not, therefore, found practicable to increase their size beyond a certain degree.

It is a further object of my invention at the same lateral spread and height to increase by several times the area of utilized wind passing through the mill structure, which is of a very small proportion in the present type windmills.

Another object of my invention is to provide a stream motor comprising the combination of a supporting frame structure which supports a number of elongated rotors arranged as a pair or a plurality of pairs, each rotor comprising a shaft and sails supported by and extending from the shaft for exposure to a flowing fluid, means pivotally journalling the rotors on the frame structure for rotation on vertical axes in spaced parallel relation, and having in cooperative combination a vertically elongated front shield supported from said frame structure and forming an up-stream shield extending between the pair or each pair of rotors substantially from in front of the shafts thereof for delivering the stream fluid toward the outer or opposite sails for turning the rotors in opposite directions, inflector means pivotally supported by the frame for movement to suitable positions for inflecting stream substance from remote opposite sides into the down stream moving sails and a member for receiving and transmitting power delivered by the rotors.

Further objects and advantages are within the scope of my invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, in which:

Fig. 1 is a cross-sectional view of a two-rotor stream motor taken upon line 1—1 of Fig. 2;

Fig. 2 is a front elevational view of the upstream side of a two-rotor wind stream motor;

Figure 5:
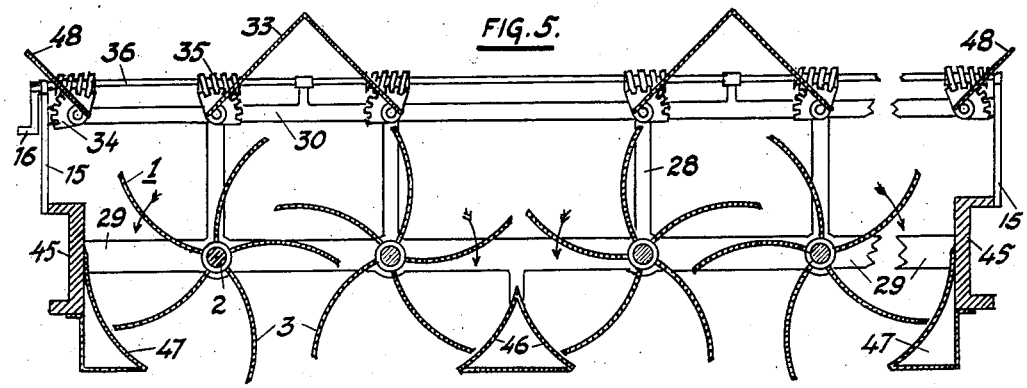
Figure 6:
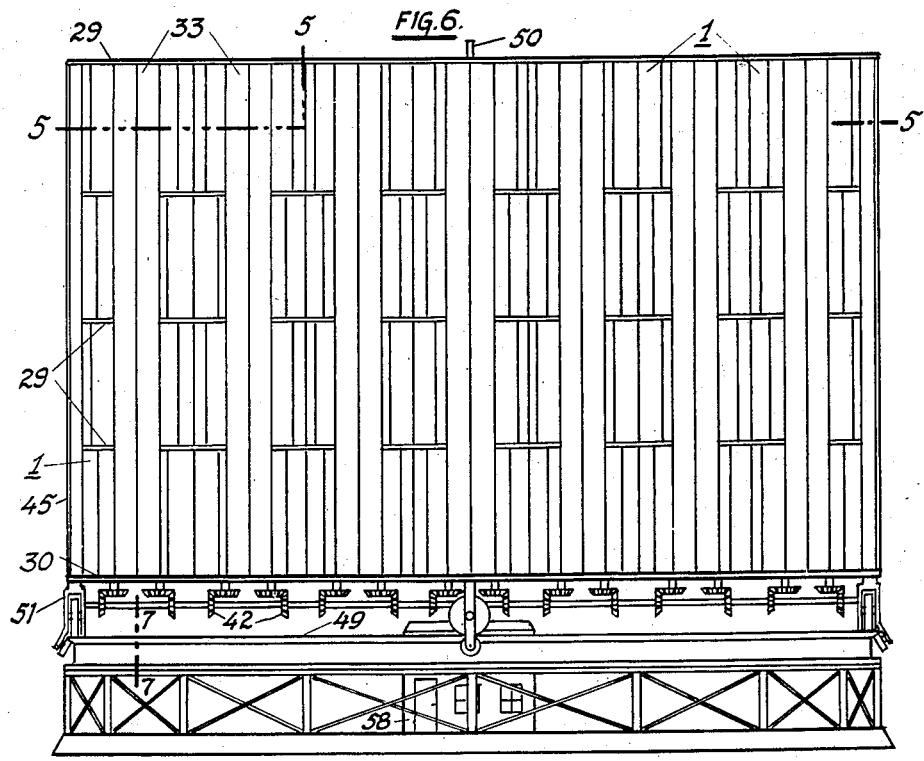

Fig. 3 shows a simplified modification of the stream motor shown on Figs. 1 and 2 from which the tube 20, the rudder 21 and the inflectors 10 are omitted, and is a cross-sectional view taken upon line 3—3 of Fig. 4;

Fig. 4 is a front elevational view of the upstream side of a two-rotor water stream motor;

Fig. 5 is a modification of the stream motor shown on Fig. 3 and is a sectional view of a multi-rotor stream motor taken upon line 5—5 of Fig. 6;

Fig. 6 is a front elevational view of a large size multi-rotor wind stream motor; and Fig. 7 is an enlarged sectional view on line 7—7 of Fig. 6.

Referring more specifically to Fig. 1 of the drawings, I have illustratively disclosed my improved stream motor as embodied either in a wind stream motor or a water stream motor, and Fig. 2 shows the particular adaptation thereof for operation in a wind or stream of air. My improved stream motor comprises two rotors 1 which are mounted and arranged to be rotated outwardly in opposite directions by the energy of the moving fluid of a stream to which the rotors are exposed. Each rotor consists of a shaft 2 having two or more sails 3 extending therefrom for receiving the force of a flowing fluid. For more efficiently converting the energy of the stream fluid impinging upon the sails 3 these are preferably curved in the conformation of a straight line generated curved surface. The straight line elements of each curved sail 3 are parallel to the axis of the shaft 1 on which these are supported, and the curvature of the respective sails is such that the forward or leading side is convex and the back or lagging side is concave.

For supporting the rotors 1 in such a manner as to effectively expose the sails thereof to the flowing fluid of a stream from which power is to be derived for remote utilization, I provide a supporting structure 4 which may be top and bottom cross-beam members having suitable bearings 5 therein in which the rotor shafts 2 are journalled in spaced parallel relation for rotation on vertical axes. From the support 4, shield supporting extensions 6 may project in an up-stream direction for supporting a vertically elongated front shield 7 on the front or up-stream side of the rotors 1. The front shield 7 is preferably suitably curved, as shown, to divide the advancing stream with a minimum of friction for effectively delivering stream fluid toward the outer or opposite sails for rotating the rotors 1 in opposite directions with outer sails moving in a down-stream direction and inner sails moving in the up-stream direction toward the front shield. The outer or vertical edges of the front shield extend to a position substantially aligned in front of the shafts 2 of the two rotors.

From each supporting member 4 additional extensions 8 project rearwardly and laterally for journalling shafts or pivots 9 of inflectors 10 for adjustable rotation on vertical axes substantially parallel to and spaced from the rotors 1. Fluid deflecting members or inflectors 10 which are pivotally supported on the shafts 9 and extend beyond the flank sides of rotors to inflect the fluid from the remote space on the sides of the motor into the rear sails. These inflectors 10 are of a vertical dimension substantially the same as the rotor, and are preferably curved as shown for greater efficiency, increasing substantially the span of the motor and the cross sectional area of the stream utilized and inflecting the fluid from both remote sides of the motor and also for controlling the impingement of fluid thereon in accordance with the adjusted angular positions of the inflectors. Suitable control mechanism is provided for adjusting the angular positions of the inflectors so that these may be turned together to corresponding angular positions. Such simultaneous adjustment may be readily accomplished by means of a horizontal worm shaft 11 extending therebetween and having worms or screws 12 at the opposite ends, one of which is right-handed and the other being left-handed. Each inflector shaft 9 is provided with a worm gear segment 14 projecting therefrom for engagement with the worms 12. The ends of the worm shaft 11 are journalled in any suitable bearing brackets 15 which may extend from the main supporting structure. The horizontal worm shaft 11 may be provided with any suitable adjusting member which may be a motor driven or a manually actuated wheel or crank 16 whereby the shaft may be rotated to turn the inflectors 10 simultaneously.

While open, as shown, the inflectors 10 substantially increase the amount of stream substance passing through the motor and they increase also by about 70% the effective span of the motor by inflecting the current from remote sides upon the rear running sails which have already passed the normal working position perpendicular to the general stream direction. The stream of wind or other stream substance coming against the motor, being compelled to pass through a small opening, is compressed and by this is forced to increase its velocity, converting it into the force of pressure. The inflectors 10 may also prevent the passage of the flowing fluid through the motor when turned inside to touch the front screen 7. The front screen 7 is to protect the up-stream moving sails from the stream pressure and to deflect the middle portion of the stream substance upon the outer sails moving in the down-stream direction.

The supporting cross-beams 4 are united into a supporting top and bottom frame structure by a vertically disposed interconnecting means, such as tube 20. To prevent any possible bending of elongated rotors by strong stream flow, a number of additional cross-beams are provided in various intermediate positions between the top and bottom cross-beams. Said additional cross-beams are affixed to the tube 20 and each has two holes through which passes the shaft of each rotor. This reinforces the rotors and creates a possibility to make the rotors 1 disproportionately high compared with rotors of same category not supplied with such reinforcing means. Such disproportionate increase in height provides a corresponding increase in the extracted power in such a manner as can not be expected from the rotors designed without such reinforcing means. The complete stream motor assembly is supported upon a base 17 which is supported in a suitable foundation 18 of concrete or other suitable construction.

For pivotally supporting the entire stream motor assembly so that the complete structure will be automatically rotated to most effectively face the stream at all times, I provide a mast 19 which is firmly secured to the base 17 and passes upwardly through the tube 20. For rotatively supporting the stream motor, for rotation around the vertically fixed mast 19, the supporting tube 20 is concentrically disposed upon the mast and connected to and between the horizontal cross-beams 4, in any suitable manner, as by welding for example. Under the lower end of the tube 20 any suitable bearing means, such as any well known friction reducing thrust bearing, may be provided for supporting the entire weight of the assembled stream motor upon the base 17 for free pivotal movement thereon, as will be readily understood. Secured along the rear side of the tube 20 and projecting rearwardly therefrom is an elongated rudder 21 of considerable area, such that the flowing stream reacts thereon to head the stream motor into the stream for effective operation at all times. In the water motors, the construction may be simplified by entirely omitting the tube 20 and the rudder 21, as the stream motor is permanently mounted to face up-stream.

For delivering the power from each individual rotor 1 the lower end of the shaft 2 of each rotor is extended through the lower cross-beam 4 for connection with any suitable power transmitting means. For this purpose suitable gears 22 may be used for transmitting the power delivered from both rotors 1 to a vertical shaft 23 which, through bevel gears 24 transmits energy to a horizontal shaft 25 which may extend to deliver the collected power to a remote point where it is to be utilized.

The mast 19 may be supported and strengthened by means of cables 26 secured to the top of the mast and inclined downwardly for anchoring on the ground at a substantial distance from the stream motor. A star of cross bars 27 may be provided on the mast 19 for spreading the cables 26 over and away from the upper portion of the structure of the stream motor. In the water motors the upper and the lower ends of the motor are arranged in a manner shown on Fig. 4.

Figs. 3 and 4 show a simplified modification of the stream motor shown on Figs. 1 and 2, the inflectors 10 and the rudder 21 being omitted. Particularly Fig. 3 is an embodiment either of a wind stream motor or a water stream motor, and Fig. 4 showing the particular adaption thereof for operation in a water stream. The mast 19 in Fig. 3 in this embodiment because it is located in front of the two rotors 1 permits the mills to be placed at a shorter distance in such a way that the forwardly moving sails 3 of one rotor are entering between those of the other shortening considerably the lateral spread of the motor. Front screen supporters 28 extending from the cross-beam 29 and fastened to the mast 19 by the second cross-beams 30, have bearings 31 in which the shafts 32 of the wings of the screen 33 may turn at an angle with the aid of any suitable control means such as a pair of worm gear segments 34 projecting therefrom and meshing with worms 35 on a shaft 36. The ends of the worm shaft 36 are journalled in any suitable bearing brackets 15 which may extend from the screen supporters 28. The worms are respectively right and left handed so the wings may be simultaneously moved apart or together by turning the crank 16, and controlling by this the force of stream pressure on the sails 3. When the wings 33 are in the position shown in full lines, the middle portion of the stream is deflected upon the down-stream moving sails 3. If the wings 33 are moved to the position shown by dotted lines at 37, a part of the stream will be allowed to press upon the up-stream moving sails 3 lessening by this the effectiveness of the stream pressure on the rearwardly running sails. If the wings 33 were in position shown by dotted line 38, the stream pressure on both the forward and the rearward moving sails would be about equalized and the motor would stop running. In the wind stream motors a tube 20, shown in Fig. 1 may be added to give the motor possibility of turning about mast 19 to face up-stream.

Fig. 4 shows the particular adaptation of my simplified motor for operation in a flowing stream of water where it may be quickly and economically installed. For this purpose, in case that the water is shallow or if there is no need of a large power, a pair of the single partitioned rotors may be fixed to the bottom side of a boat or container 39, as it is shown on the upper part of Fig. 4, leaving the lower end free in the flow of water. In case that the water is deep and greater power is needed, the motor rotors may be made of several partitions or sections, as it is shown in Fig. 2 and the lower end of the vertical mast 19 may be firmly anchored in a suitable foundation 40 upon the upper end of one or more piles 40' driven into the bottom of the stream. The upper ends of the mill rotor shafts 2 pass up through suitable shaft sealing sleeves 41 in the boat or container 39, and by means of suitable cooperative bevel gears 42 on the shafts 2 and 43 the power is collected by the shaft 43 from both individual rotating rotors to be used to run an electric generator 44, or by extending the shaft 43 through the side of the enclosure 39 the collected power may be transmitted for remote use, as will be understood.

Fig. 5 is a cross-sectional view of a part of multi-rotor stream motor as embodied either in a wind stream motor or a water stream motor, and taken upon line 5—5 of Fig. 6, and shows a different embodiment of the stream motor shown on Fig. 3. This embodiment has substantially similar parts with exception of the mast 19 which is replaced by two frame standards 45 to which the cross-beams 29 are attached. Also in this motor may be added the stream pressure keepers 46, the two flank pressure keepers 47 and two flank inflectors 48. The stream pressure keepers 46 and 47 are associated with the sails of the rotors moving in a down-stream direction for preserving from discharge into the space the stream pressure accumulated upon the rear running sails up to the time that the following sail may take the full pressure. Said pressure keepers are made in the form of the curved plates concentric with and spaced from the orbit of the peripheral edges of rotor's sails. The stream flowing between the adjoining pairs of rotors is divided in two parts by means of the pressure keepers, each part changing direction to flow behind the up-stream running sails where an area of negative pressure or vacuum is formed and filling said vacuum. A pair of vertically extended flank inflectors 48 are pivotally attached to the front edge of the frame standards 45 for adjustably controlling the flow of stream fluid in association with and by the same means as the front screens 33.

Fig. 6 shows the particular adaptation of a multi-rotor wind stream motor, the elevated circular track 49 on which this motor turns to face the wind by means of a rudder 50 and the carriages 51 supporting the frame 45 of the motor. Similar to the previous embodiment suitable power transmission means is provided as represented by a train of bevel gears 42, which may deliver the power to a power house 58 in the center of the circular rail track. Four sections of seven pairs of rotors 1 are shown in vertical tandem arrangement between the five cross beams 29 and 30 of the frame, reinforcing the rotor shafts at every section. The sails of the rotors between every section are angularly advanced to insure smoothness of rotation. The front screens 33 protect the up-stream moving sails on all the rotors at a normal stream pressure and are moved apart and away from each other at an excessive stream pressure to allow the stream to press upon the up stream moving sails, lessening by this the pressure upon the down stream moving sails. The medium size multi-rotor wind motor may also be arranged on a mast in the manner shown in Figs. 1, 2, 3 and 4. In the water-stream multi-rotor motor the circular rail track, the mast, the carriages and the rudder are omitted, the upper and the lower sides of the motor being arranged in a manner similar to that shown on Fig. 4.

Fig. 7 shows the cross-section of the rail 52 of the circular track 49 shown on Fig. 6. The rail 52 has a square flange 53 raising in the middle of the upper rail face to prevent the side sliding of the gravity wheel 54 of the carriage 51. Journalled on the prolongated ends of the fork 55 are two safety wheels 56 running upward at inclined opposed positions against the lower faces 57 of the rail to keep the frame from overturning in case of a heavy wind.

It is obvious that various modifications may be made in the apparatus herein shown and described, without departing from the principle of my invention and that those which are shown are only examples explaining the various modes of use of the same stream motor, designed on the same principles.

I claim:

1. A stream motor comprising, a vertical frame with a number of parallel horizontal cross-beams, two or more pairs of rotors journalled in said cross-beams for rotation on vertical axes, a screen for each pair of rotors, said screen being composed of two wings, means for pivotally supporting said pair of wings from said cross-beams adjacent the upstream side of each rotor, a pressure keeper mounted between each adjacent pair of rotors adjacent to and spaced from the peripheral edges of the down-stream moving sails, two flank pressure keepers attached to said frame and positioned adjacent the outermost down stream moving sails, two inflectors pivotally supported by said frame in suitable advanced positions for inflecting stream substance upon the outermost down stream moving sails, means for turning said wing and inflectors to control the pressure on the rotors, a member for receiving and transmitting power from the rotors, a circular track, a plurality of wheels for supporting the stream motor on said track, safety wheels engaging under portions of said track to secure the wheels to the track to prevent overturning in case of a heavy stream current, and means responsive to the flowing fluid of the stream for facing said frame up-stream.

2. A stream motor comprising, a vertical frame with a number of parallel horizontal cross-beams, two or more pairs of rotors journalled in said cross-beams for rotation on vertical axes, a front screen for each pair of rotors, a pressure keeper mounted between adjacent pairs of rotors and positioned adjacent to the peripheral edges of the down stream moving sails, two flank pressure keepers attached to said frame and positioned adjacent the outermost down stream moving sails, two inflectors supported by said frame in suitable advanced positions for inflecting stream substance upon the outermost down stream moving sails, a member for receiving and transmitting the power from the rotors, and means to keep the motor facing up-stream.

MICHAEL I. TOPALOV.